United States Patent
Nishi

(10) Patent No.: US 9,322,722 B2
(45) Date of Patent: Apr. 26, 2016

(54) OIL TEMPERATURE SENSOR MOUNTING STRUCTURE FOR INTERNAL COMBUSTION ENGINE

(71) Applicant: HONDA MOTOR CO., LTD, Tokyo (JP)

(72) Inventor: Toru Nishi, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 691 days.

(21) Appl. No.: 13/712,205

(22) Filed: Dec. 12, 2012

(65) Prior Publication Data

US 2013/0182743 A1 Jul. 18, 2013

(30) Foreign Application Priority Data

Jan. 18, 2012 (JP) ................................. 2012-008407

(51) Int. Cl.
*G01K 1/08* (2006.01)
*G01K 1/14* (2006.01)
*G01K 13/00* (2006.01)

(52) U.S. Cl.
CPC .................. *G01K 13/00* (2013.01); *G01K 1/14* (2013.01); *G01K 2205/00* (2013.01)

(58) Field of Classification Search
CPC ......... G01K 13/00; G01K 17/00; G01K 1/14; G01K 1/08
USPC .................. 374/141, 142, 144, 148, 163, 208
See application file for complete search history.

(56) References Cited

U.S. PATENT DOCUMENTS

| | | | | |
|---|---|---|---|---|
| 2,107,188 A | * | 2/1938 | Ryder et al. | 184/104.1 |
| 5,638,792 A | * | 6/1997 | Ogawa | F02D 41/047 123/480 |
| 7,337,755 B2 | * | 3/2008 | Gokan | F01M 5/007 123/193.3 |
| 7,980,122 B2 | * | 7/2011 | Fujimoto et al. | 73/115.02 |
| 8,291,882 B2 | * | 10/2012 | Sugiura | 123/196 R |
| 2005/0092283 A1 | * | 5/2005 | Eguchi | F01N 13/08 123/196 M |
| 2006/0065218 A1 | * | 3/2006 | Gokan et al. | 123/41.828 |
| 2009/0080492 A1 | * | 3/2009 | Takeuchi | 374/144 |
| 2009/0241867 A1 | * | 10/2009 | Sugiura | F01M 11/02 123/41.79 |
| 2013/0255415 A1 | * | 10/2013 | Adachi | F16H 59/042 74/337.5 |
| 2014/0303875 A1 | * | 10/2014 | Tsukagoshi | F02D 41/123 701/104 |

FOREIGN PATENT DOCUMENTS

| | | | |
|---|---|---|---|
| JP | 2004-293348 A | | 10/2004 |
| JP | 2009236053 A | * | 10/2009 |
| JP | 2011-001923 A | | 1/2011 |

* cited by examiner

*Primary Examiner* — Gail Kaplan Verbitsky
(74) *Attorney, Agent, or Firm* — Westerman, Hattori, Daniels & Adrian, LLP

(57) ABSTRACT

An oil temperature sensor mounting structure for an internal combustion engine is provided which is capable of improving appearance while protecting an oil temperature sensor with a simple structure and further capable of miniaturizing and downsizing a vehicle body. In the oil temperature sensor mounting structure for an internal combustion engine in which an oil temperature sensor for detecting temperature of oil is mounted to a cylinder portion protruding upwardly from a crankcase, the cylinder portion has an upper portion laterally covered with a body cover. A head cover is provided on a cylinder head constituting the upper portion of the cylinder portion. The head cover has an upper portion formed with a shoulder. The shoulder is located below a periphery thereof and protrudes laterally. The oil temperature sensor is mounted to the shoulder inwardly in a vehicle width direction of the body cover.

20 Claims, 11 Drawing Sheets

OIL TEMPERATURE SENSOR MOUNTING STRUCTURE FOR INTERNAL COMBUSTION ENGINE

CROSS-REFERENCE TO RELATED APPLICATIONS

The present application claims priority under 35 U.S.C. §119 to Japanese Patent Application No. 2012-008407, filed Jan. 18, 2012, entitled "Oil Temperature Sensor Mounting Structure for Internal Combustion Engine." The contents of this application are incorporated herein in their entirety.

TECHNICAL FIELD

The present invention relates to an oil temperature sensor mounting structure for an internal combustion engine in which an oil temperature sensor is provided on a cylinder portion.

BACKGROUND ART OF THE INVENTION

By detecting the temperature of oil circulating through an internal combustion engine with an oil temperature sensor provided on the internal combustion engine, it is possible to accurately gain an understanding of, for example, the warming-up state of the internal combustion engine.

Known examples of such oil temperature sensor mounting structure for an internal combustion engine include: structure (1) in which a temperature sensor for detecting the temperature of oil in an oil return passage is mounted to a lower portion of a cylinder of the internal combustion engine together with a sensor cover that protects the temperature sensor (for example, see JP-A No. 2004-293348; and structure (2) in which a temperature sensor for detecting the temperature of oil in crossing oil circuits provided in a cylinder head is mounted to a side of the cylinder head of the internal combustion engine (for example, see JP-A No. 2011-1423).

JP-A No. 2004-293348 discloses the structure in which the temperature sensor is mounted on a lower position in the internal combustion engine. Furthermore, in order to protect the temperature sensor from scattering stones or the like, a sensor cover that protects the temperature sensor from the front is mounted to the cylinder. Therefore, the number of components, such as the sensor cover and bolts for fastening the sensor cover to the cylinder, is increased. Also, to mount the sensor cover, it is necessary to provide a sensor cover mounting portion on the cylinder.

In JP-A No. 2011-1423, the temperature sensor protrudes laterally from a cylinder head, thereby likely to result in a deterioration in appearance. Even if a covering member for covering the temperature sensor is provided, the covering member needs to be widely spaced apart laterally from the internal combustion engine to prevent its interference with the temperature sensor. If the covering member is further laterally disposed in this manner, an increase in size of a vehicle body is caused.

Accordingly, the present invention has been made in view of the foregoing, and an object of the present invention is to provide an An oil temperature sensor mounting structure for an internal combustion engine is provided which is capable of improving the appearance while protecting an oil temperature sensor with a simple structure and further capable of miniaturizing and downsizing a vehicle body.

SUMMARY OF THE INVENTION

In an oil temperature sensor mounting structure for an internal combustion engine in which an oil temperature sensor for detecting temperature of oil is mounted to a cylinder portion protruding upwardly from a crankcase, the cylinder portion has an upper portion laterally covered with a body cover. A head cover is provided on a cylinder head constituting an upper portion of the cylinder portion. The head cover has an upper portion formed with a shoulder shoulder, the shoulder shoulder being located below a periphery thereof and protruding laterally. The oil temperature sensor is mounted to the shoulder inwardly in a vehicle width direction of the body cover.

With this construction, the oil temperature sensor can be protected by laterally covering it with the body cover, thereby eliminating the need for a special protective member. Therefore, cost can be reduced. Furthermore, the oil temperature sensor is mounted to the shoulder shoulder formed at the upper portion of the head cover. Thus, the oil temperature sensor, which is disposed at the upper portion of the shoulder shoulder, can be also protected from below by the shoulder shoulder. In this manner, the oil temperature sensor can be protected with simple structures such as the shoulder shoulder and the above-described existing body cover.

Moreover, the oil temperature sensor is covered with the body cover and prevented from being exposed to the outside, thereby allowing an improvement in appearance. Further, since the oil temperature sensor can be mounted to the shoulder shoulder from above and is prevented from protruding greatly laterally, the body cover can be disposed close to the internal combustion engine, thereby allowing miniaturization and downsizing of the vehicle body.

In the above-described construction, the arrangement may be such that: the cylinder head is provided with a camshaft, the camshaft being provided at one end thereof with a driven sprocket to which torque to the camshaft is transmitted from the crankshaft; and the oil temperature sensor is disposed lateral to the driven sprocket, in the vicinity of a periphery of a bearing portion that supports the camshaft. With this arrangement, the dead space formed lateral to the driven sprocket in the vicinity of the periphery of the bearing portion can be effectively used, and the oil temperature sensor can be prevented from protruding laterally.

Furthermore, in the above-described construction, the arrangement may be such that the oil temperature sensor includes a temperature detector, the temperature detector being provided in a vertically-expanded oil storage portion facing an end of an oil passage formed in the camshaft. With this arrangement, the oil storage portion can be constantly filled with a volume of the oil to be supplied to the camshaft, thereby allowing accurate detection of the temperature of the oil in the oil storage portion and accurate control of the fast idle state or the like of the internal combustion engine.

Also, in the above-described construction, the arrangement may be such that the temperature detector of the oil temperature sensor is located below an upper end of the oil passage of the camshaft. With this arrangement, even if air bubbles accumulate in the oil passage or an upper portion of the oil storage portion, the temperature detector of the oil temperature sensor can detect the temperature of oil without being affected by the air bubbles, thereby allowing a further increase in the precision of detection of the temperature of the oil.

Moreover, in the above-described construction, the arrangement may be such that the body cover includes two covers separated in a vehicle-body front-rear direction, and the oil temperature sensor is provided in the vicinity of a separated position of the two covers. With this arrangement, by removing one of the covers, maintenance for the oil temperature sensor can be easily performed. In addition, since the oil temperature sensor is provided in the vicinity of the separated position of the two covers, the maintenance can be performed from any side of the two covers, so that maintainability can be increased.

Additionally, in the above-described construction, the arrangement may be such that a sensor cord connected to the oil temperature sensor extends upwardly from the oil temperature sensor and is connected to a main harness disposed along a body frame, and the oil temperature sensor and the sensor cord are covered with an auxiliary machine from a vehicle-body front. With this arrangement, the oil temperature sensor and the sensor cord are protected from the vehicle-body front by the auxiliary machine. Thus, there is no need to make allowance in the length of the sensor cord from an upper end of the oil temperature sensor to the main harness, for example, for objects interfering with the sensor cord from the vehicle-body front, and therefore the sensor cord can be reduced in length.

Also, in the above-described construction, the arrangement may be such that the auxiliary machine is an oil tank that stores the oil. With this arrangement, even after the stop of the internal combustion engine, the internal combustion engine is kept warm by the radiation heat from the oil tank. Therefore, atomization of the fuel supplied to the internal combustion engine is promoted, thereby allowing an improvement in starting performance of the internal combustion engine. Furthermore, the internal combustion engine, especially in the mounting position of the oil temperature sensor and its vicinity, is kept warm. Thus, in restarting the internal combustion engine, a reduction in the temperature of the oil circulating through the internal combustion engine can be prevented. Also, it is possible to accurately gain an understanding of the warming-up state of the internal combustion engine on the basis of the oil temperature detected by the oil temperature sensor. Consequently, it is possible to quickly detect, with the oil temperature sensor, when the warming-up of the internal combustion engine has been completed, thereby allowing a reduction in the amount of time for warming-up operation.

The upper portion of the cylinder portion is laterally covered with the body cover. The head cover is provided on the cylinder head constituting the upper portion of the cylinder portion. The upper portion of the head cover is formed with the shoulder located below a periphery thereof and protruding laterally. The oil temperature sensor is mounted to the shoulder inwardly in the vehicle width direction of the body cover. Thus, the oil temperature sensor can be protected by laterally covering it with the body cover, thereby eliminating the need for a special protective member. Therefore, cost can be reduced. Furthermore, the oil temperature sensor is mounted to the shoulder formed at the upper portion of the head cover. Thus, the oil temperature sensor, which is disposed at the upper portion of the low-level portion, can be also protected from below by the low-level portion. In this manner, the oil temperature sensor can be protected with simple structures such as the shoulder and the above-described existing body cover.

Moreover, the oil temperature sensor is covered with the body cover and prevented from being exposed to the outside, thereby allowing an improvement in appearance. Further, since the oil temperature sensor can be mounted to the shoulder from above and is prevented from protruding greatly laterally, the body cover can be disposed close to the internal combustion engine, thereby allowing miniaturization and downsizing of the vehicle body.

Furthermore, the camshaft provided in the cylinder head is provided at one end thereof with the driven sprocket to which torque to the camshaft is transmitted from the crankshaft. Also, the oil temperature sensor is disposed lateral to the driven sprocket, in the vicinity of a periphery of the bearing portion that supports the camshaft. Thus, the dead space formed lateral to the driven sprocket in the vicinity of the periphery of the bearing portion can be effectively used, and the oil temperature sensor can be prevented from protruding laterally.

Furthermore, the temperature detector of the oil temperature sensor is provided in the vertically-expanded oil storage portion facing the end of the oil passage formed in the camshaft. Thus, the oil storage portion can be constantly filled with a volume of the oil to be supplied to the camshaft, thereby allowing accurate detection of the temperature of the oil in the oil storage portion and accurate control of the fast idle state or the like of the internal combustion engine.

Also, the temperature detector of the oil temperature sensor is located below the upper end of the oil passage of the camshaft. Thus, even if air bubbles accumulate in the oil passage or an upper portion of the oil storage portion, the temperature detector of the oil temperature sensor can detect the temperature of oil without being affected by the air bubbles, thereby allowing a further increase in the precision of detection of the temperature of the oil.

Moreover, the body cover includes the two covers separated in the vehicle-body front-rear direction, and the oil temperature sensor is provided in the vicinity of the separated position of the two covers. Thus, by removing one of the covers, maintenance for the oil temperature sensor can be easily performed. In addition, since the oil temperature sensor is provided in the vicinity of the separated position of the two covers, the maintenance can be performed from any side of the two covers, so that maintainability can be increased.

Additionally, the sensor cord connected to the oil temperature sensor extends upwardly from the oil temperature sensor and is connected to the main harness disposed along the body frame, and the oil temperature sensor and the sensor cord are covered with the auxiliary machine from the vehicle-body front. Thus, since the oil temperature sensor and the sensor cord are protected from the vehicle-body front by the auxiliary machine, there is no need to make allowance in the length of the sensor cord from an upper end of the oil temperature sensor to the main harness, for example, for objects interfering with the sensor cord from the vehicle-body front, and therefore the sensor cord can be reduced in length.

Also, the auxiliary machine is the oil tank that stores the oil. Thus, even after the stop of the internal combustion engine, the internal combustion engine is kept warm by the radiation heat from the oil tank. Therefore, atomization of the fuel supplied to the internal combustion engine is promoted, thereby allowing an improvement in starting performance of the internal combustion engine. Furthermore, the internal combustion engine, especially in the mounting position of the oil temperature sensor and its vicinity, is kept warm. Thus, in restarting the internal combustion engine, a reduction in the temperature of the oil circulating through the internal combustion engine can be prevented. Also, it is possible to accurately gain an understanding of the warming-up state of the internal combustion engine on the basis of the oil temperature detected by the oil temperature sensor. Consequently, it is possible to quickly detect, with the oil temperature sensor, when the warming-up of the internal combustion engine has been completed, thereby allowing a reduction in the amount of time for warming-up operation.

BRIEF DESCRIPTION OF THE DRAWINGS

The advantages of the invention will become apparent in the following description taken in conjunction with the drawings wherein.

DETAILED DESCRIPTION OF THE INVENTION

Figure 1:
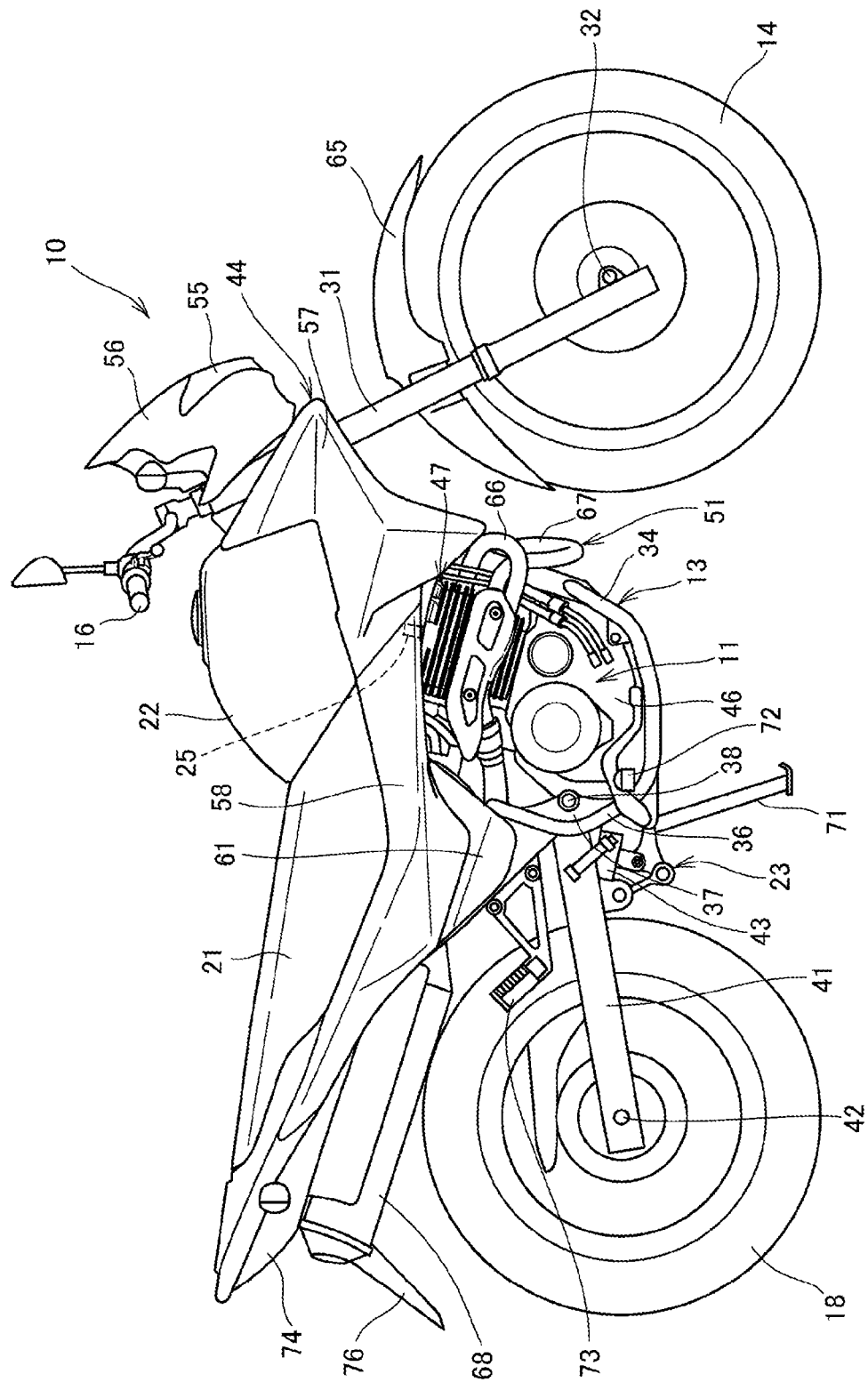
FIG. 1 is a right side view showing a motorcycle equipped with an internal combustion engine.

Hereinafter, an embodiment will be described with reference to the accompanying drawings. It is to be noted that, throughout the description, references to directions, such as front, rear, left, right, upward, and downward, are made with reference to a vehicle body, unless otherwise stated. It is also to be noted that, in the drawings, reference numeral FR denotes the front of the vehicle body, reference numeral UP denotes the upper side of the vehicle body, and reference numeral LE denotes the left of the vehicle body.

FIG. 1 is a right side view showing a motorcycle 10 equipped with an internal combustion engine 11.

The motorcycle 10 is composed mainly of: a body frame 13 serving as a framework; a front wheel 14; a handlebar 16 for steering the front wheel 14; the internal combustion engine 11 supported at a lower portion of the body frame 13; a rear wheel 18 that is driven by the power of the internal combustion engine 11; a seat 21; and a fuel tank 22 that stores the fuel for use in the internal combustion engine 11. An oil temperature sensor 25 for detecting the temperature of oil circulating through the internal combustion engine 11 is mounted to an upper portion of the internal combustion engine 11.

More specifically, the motorcycle 10 includes: a front fork 31 that is supported at a front end of the body frame 13 in such a manner as to be turnable right and left; the front wheel 14 that is mounted to a lower end of the front fork 31 through an axle 32; the handlebar 16 that is mounted to an upper end of the front fork 31; a pair of left and right lower frames 34 (only the reference numeral 34 on the near side is shown) that form a lower portion of the body frame 13; a pair of left and right center frames 36 that are coupled to rear ends of the lower frames 34 and form the body frame 13; the internal combustion engine 11 that is mounted to the lower frames 34 and the center frames 36; pivot plates 37 (only the reference numeral 37 on the near side is shown) that are mounted to the center frames 36 and form the body frame 13; a swing arm 41 that is vertically swingably mounted to the pivot plates 37 through a pivot shaft 38; the rear wheel 18 that is mounted to a rear end of the swing arm 41 through an axle 42; the fuel tank 22 that is mounted to an upper front portion of the body frame 13; the seat 21 that is disposed at the rear of the fuel tank 22 and mounted to a rear portion of the body frame 13; a link mechanism 23 that couples the body frame 13 and the swing arm 41 to each other; a cushion unit 43 that extends between the link mechanism 23 and the body frame 13; and a body cover 44 that laterally covers an upper portion of the body frame 13.

The internal combustion engine 11 includes a cylinder portion 47 that protrudes upwardly from a crankcase 46. An exhaust system 51 extends rearwardly of the vehicle body from a front portion of the cylinder portion 47.

The body cover 44 is composed of: a front cowl 56 that covers the periphery of a headlight 55; a pair of left and right front shrouds 57 (only the reference numeral 57 on the near side is shown) that laterally covers an upper portion of the front fork 31, a front portion of the fuel tank 22, and an upper portion of the internal combustion engine 11; a pair of left and right side covers 58 (only the reference numeral 58 on the near side is shown) that laterally covers lower portions of the fuel tank 22 and the seat 21; and a pair of left and right center covers 61 (only the reference numeral 61 on the near side is shown) that laterally covers the center of side portions of the vehicle body.

It is to be noted that reference numeral 65 denotes a front fender that covers the front wheel 14 from above; reference signs 66 and 67 denote exhaust pipes that constitute the exhaust system 51; reference numeral 68 denotes a muffler that constitutes the exhaust system 51; reference numeral 71 denotes a side stand; reference numeral 72 denotes a rider step; reference numeral 73 denotes a pillion step; reference numeral 74 denotes a tail lamp; and reference numeral 76 denotes a rear fender that covers the rear wheel 18 from above.

Figure 2:
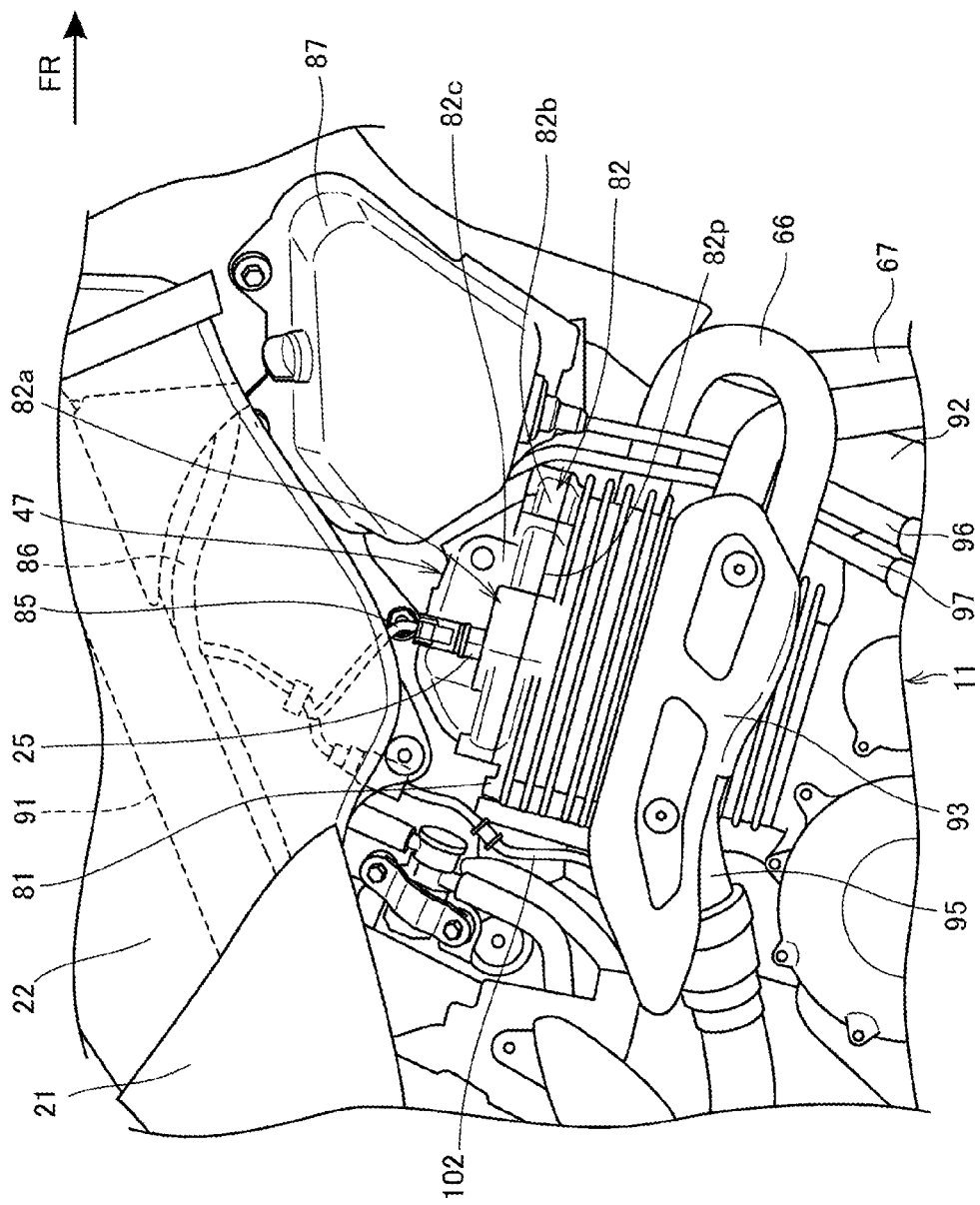
FIG. 2 is a right side view showing parts of the motorcycle.

FIG. 2 is a right side view showing parts of the motorcycle.

A cylinder head 81 and a head cover 82 that closes an upper opening of the cylinder head 81 are provided at an upper portion of the cylinder portion 47 of the internal combustion engine 11. The head cover 82 is formed, on the right of an upper surface thereof, with a shoulder 82$a$ that is lowered with respect to its periphery. The oil temperature sensor 25 is mounted to the shoulder 82$a$ in such a manner as to extend in a direction perpendicular to a mating face 82$p$ of the head cover 82 with the cylinder head 81. It is to be noted that reference numeral 85 denotes a sensor cord that is connected to an upper portion of the oil temperature sensor 25. The sensor cord 85 extends upwardly from the oil temperature sensor 25 and is connected to a main harness 86 that extends in a vehicle-body front-rear direction.

The oil temperature sensor 25 is surrounded from above by the fuel tank 22, from the front by an oil tank 87 that constitutes a dry sump lubricating structure, from below by a lower wall 82$b$ that forms the shoulder 82$a$ of the head cover 82, from the left (the far side) by a vertical wall 82$c$ that forms the shoulder 82$a$ of the head cover 82, and from the right (the near side) by the body cover 44 (more specifically, the front shroud 57 and the side cover 58). It is to be noted that reference signs 91 and 92 denote a main frame and a down frame that constitute the body frame 13; reference numeral 93 denotes a heat shield cover that covers rear portions of the exhaust pipes 66 and 67 and a collecting pipe 95 connected to the exhaust pipes 66 and 67; and reference signs 96 and 97 denote two oil tubes that are connected between an oil pump (not shown) provided on the internal combustion engine 11 and the oil tank 87.

As described above, the oil temperature sensor 25 is surrounded by the fuel tank 22, the oil tank 87, the lower wall 82$b$, the vertical wall 82$c$, and the body cover 44. Thus, the oil temperature sensor 25 can be protected from collision of spatters, such as stones and dirt, against the oil temperature sensor 25, or objects interfering with the oil temperature sensor 25. Furthermore, the oil tank 87 is disposed close to the oil temperature sensor 25, the head cover 82, and the cylinder head 81. Thus, for example, when the operation of the internal combustion engine 11 is stopped, the head cover 82 and the cylinder head 81 can be kept warm by high-temperature heat from the oil tank 87.

An oil temperature signal detected by the oil temperature sensor 25 is sent to an engine control unit (ECU) (not shown). On the basis of the oil temperature signal, the engine control unit controls, for example, during idling of the internal combustion engine 11, the amount of fuel supply to a combustion chamber of the internal combustion engine 11 from a fuel injection valve (not shown) to increase or decrease idle-speed in starting the internal combustion engine 11.

For example, if the oil temperature is lower than a predetermined temperature, the engine control unit determines that warming-up of the internal combustion engine 11 is necessary, and increases the amount of fuel and the idle-speed (so-called "fast idle"). On the other hand, if the oil temperature becomes the predetermined temperature or more, the engine control unit determines that warming-up of the internal combustion engine 11 has been completed, and decreases the amount of fuel and the idle-speed.

Figure 3:
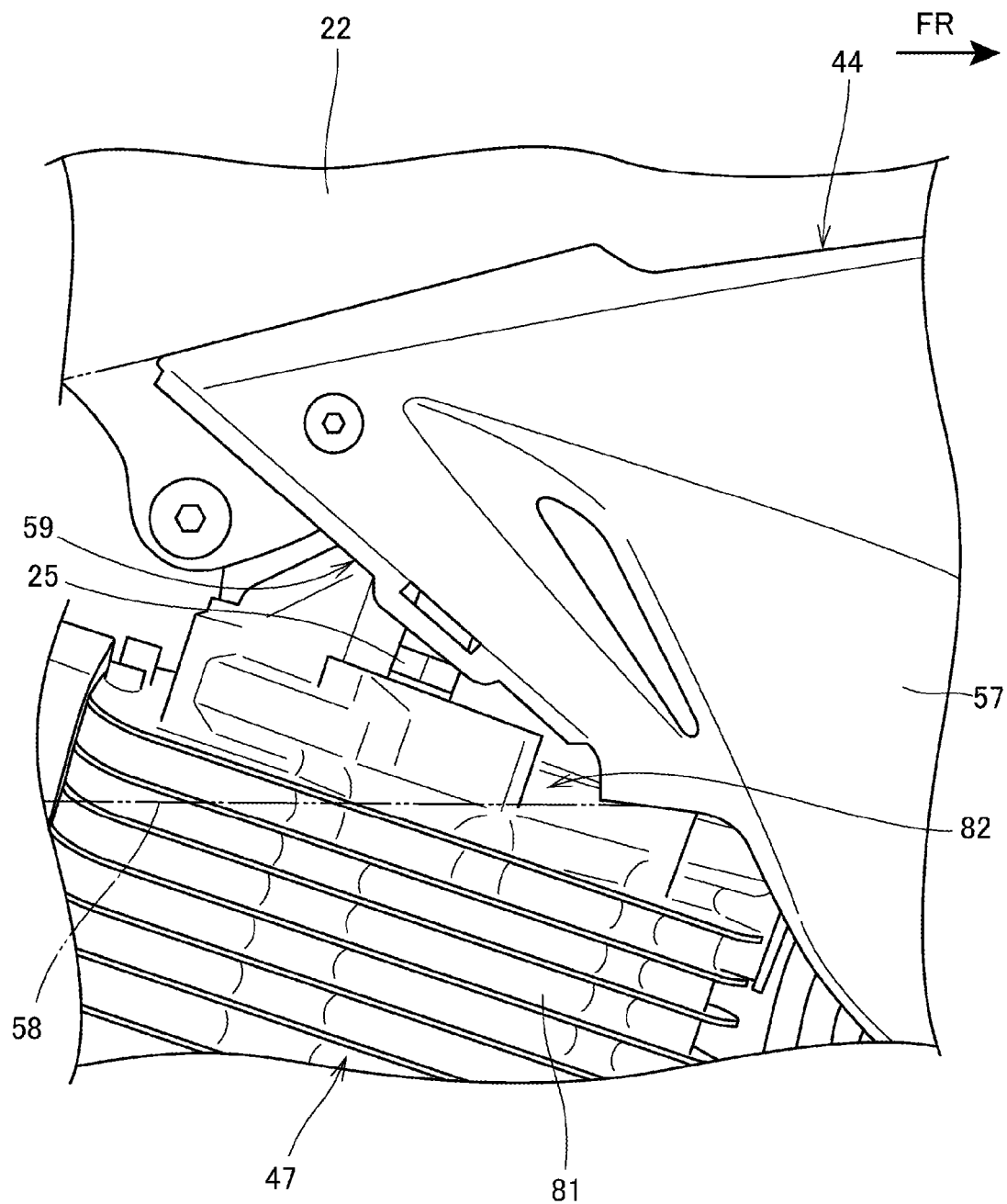
FIG. 3 is a right side view showing parts of the motorcycle with a portion of a body cover mounted.

FIG. 3 is a right side view showing the essential parts of the motorcycle with a portion of the body cover mounted, and shows the state in which the side cover 58 constituting the body cover 44 is removed from the vehicle body and the front shroud 57 constituting the body cover 44 is mounted.

The oil temperature sensor 25 is mounted to the head cover 82 in a manner overlapping a mating portion 59 between the front shroud 57 and the side cover 58 in side view. Therefore, the oil temperature sensor 25 can be removed by removing only the side cover 58, and then turning and loosening the oil temperature sensor 25 with a tool and inserting a hand into the inside from below the front shroud 57 and holding the oil temperature sensor 25. Consequently, maintenance for the oil temperature sensor 25 can be easily done.

Figure 4:
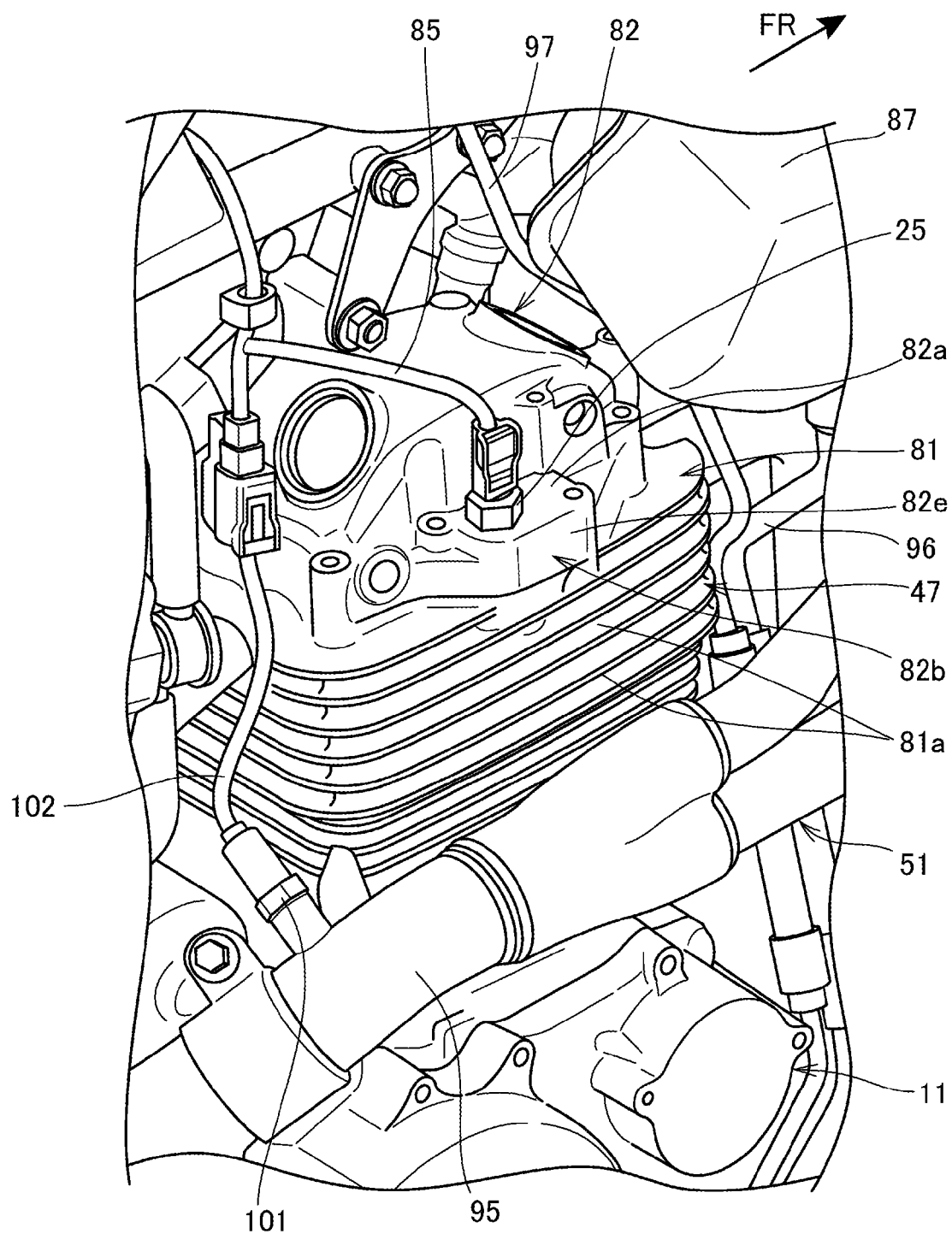
FIG. 4 is a perspective view showing a cylinder portion of the internal combustion engine, with an oil temperature sensor mounted, and its periphery.

FIG. 4 is a perspective view showing a cylinder portion of the internal combustion engine, with the oil temperature sensor mounted, and its periphery.

The cylinder head 81 and the head cover 82 are provided at the upper portion of the cylinder portion 47 of the internal combustion engine 11. The shoulder 82a is formed at the upper right portion of the head cover 82. The oil temperature sensor 25 is mounted to the shoulder 82a from above. The sensor cord 85 is connected to an upper end of the oil temperature sensor 25.

The lower wall 82b forming the shoulder 82a protrudes rightward. A side surface 82e of the lower wall 82b is substantially flush in a vehicle width direction with plural laterally-protruding fins 81a of the cylinder head 81, or protrudes slightly in the vehicle width direction beyond the fins 81a.

The sensor cord 85 extends upwardly from the oil temperature sensor 25 and joins a sensor cord 102 that extends upwardly from an oxygen sensor 101 mounted to the collecting pipe 95 of the exhaust system 51, and then extends to the main harness 86 (see FIG. 2) located further upward.

Figure 5:
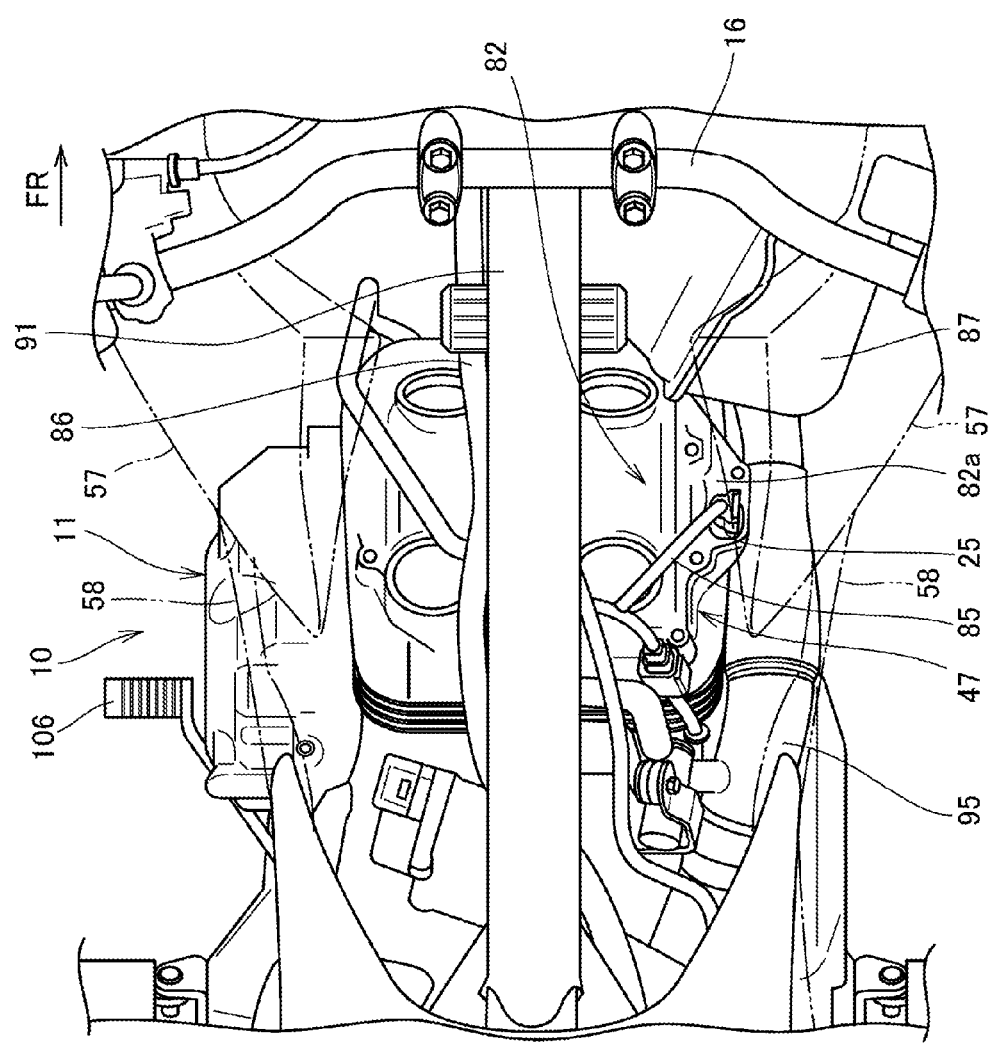
FIG. 5 is a plan view showing parts of the motorcycle.

FIG. 5 is a plan view showing parts of the motorcycle 10.

The oil tank 87 is disposed forward of the oil temperature sensor 25 mounted to the head cover 82. The oil temperature sensor 25 and the oil tank 87 are laterally covered with the front shroud 57. The oil temperature sensor 25 is further laterally covered with the side cover 58. It is to be noted that reference numeral 106 denotes a gear change pedal included in a transmission.

Referring to FIGS. 2 and 5, the oil tank 87 is disposed forward of the oil temperature sensor 25. Thus, even when the operation of the internal combustion engine 11 is in a stopped state, the cylinder head 81 and the head cover 82 are kept warm by radiation heat from the oil tank 87. Therefore, when the internal combustion engine 11 restarts, warming-up of the internal combustion engine 11 can be completed early, and the completion of the warming-up can be quickly detected by the oil temperature sensor 25. Consequently, for example, in restarting the internal combustion engine 11, the fast idle state of the internal combustion engine 11 can be shortened, thereby allowing improvement of fuel efficiency.

Figure 6:
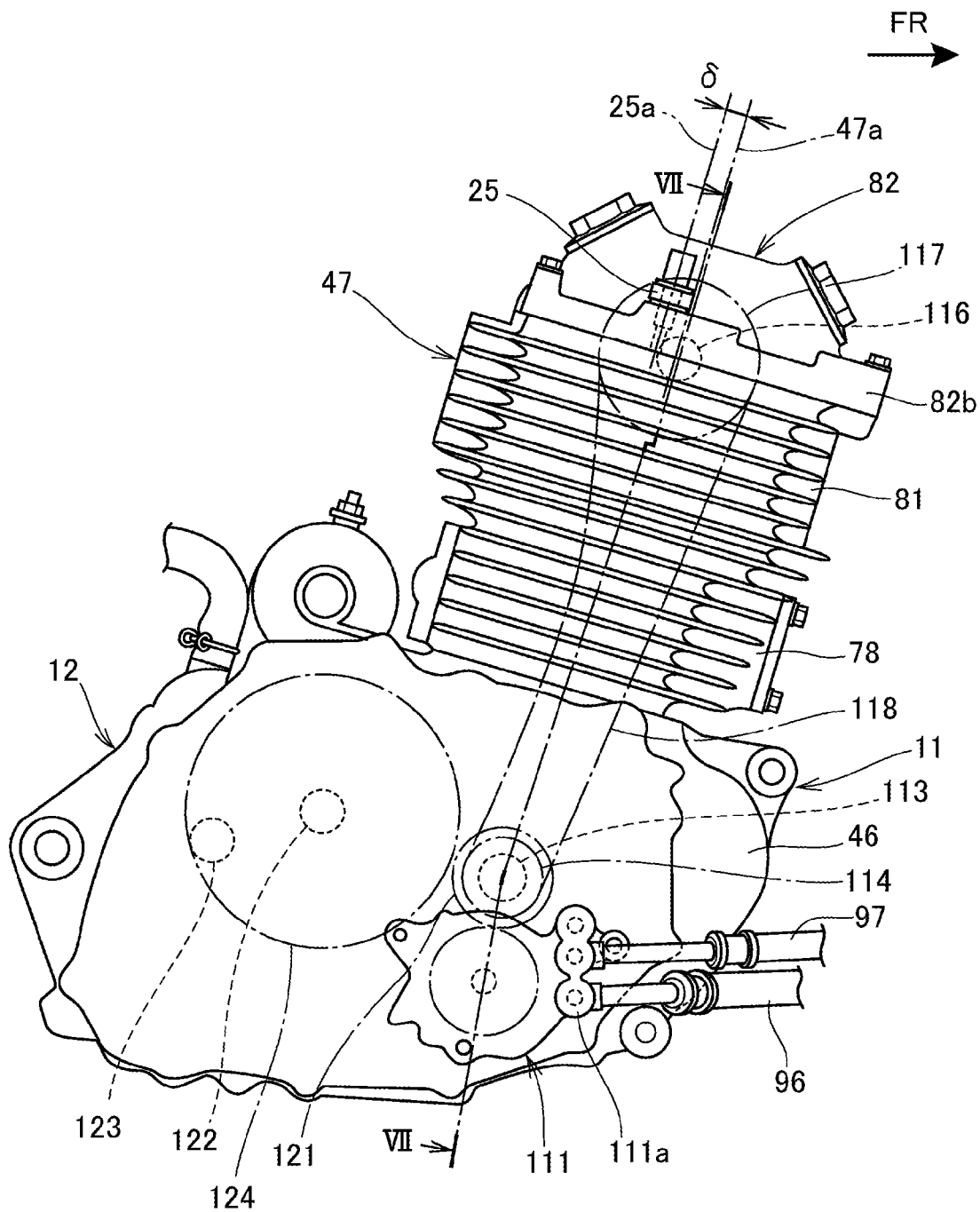
FIG. 6 is a right side view showing the internal combustion engine.

FIG. 6 is a right side view showing the internal combustion engine 11.

The internal combustion engine 11 is an air-cooled power source including: the crankcase 46 also serving as a case for the transmission 12 that is integrally provided in the rear of the internal combustion engine 11; and the cylinder portion 47 provided so as to extend upwardly from a front upper portion of the crankcase 46. The cylinder portion 47 is composed of: a cylinder block 78 mounted to the front upper portion of the crankcase 46; the cylinder head 81 mounted to an upper portion of the cylinder block 78; and the head cover 82 mounted to an upper portion of the cylinder head 81.

An axis 25a of the oil temperature sensor 25 is offset by a distance 6 rearwardly of the vehicle body with respect to a cylinder axis 47a that passes through the center of a cylinder bore (not shown) formed within the cylinder portion 47.

An oil pump 111 is provided at a right portion of the crankcase 46. The two oil tubes 96 and 97 are connected to the oil pump 111 through a tube connection 111a formed on the crankcase 46.

It is to be noted that reference numeral 113 denotes a crankshaft; reference numeral 114 denotes a drive sprocket that is mounted to the crankshaft 113; reference numeral 116 denotes a camshaft; reference numeral 117 denotes a driven sprocket that is mounted to the camshaft 116; reference numeral 118 denotes a timing chain that extends between the drive sprocket 114 and the driven sprocket 117; reference numeral 121 denotes a crankshaft gear; reference signs 122 and 123 denote a main shaft and a countershaft that are included in the transmission 12; and reference numeral 124 denotes a main shaft gear that is mounted to the main shaft 122 to mesh with the crank gear 121.

Figure 7:
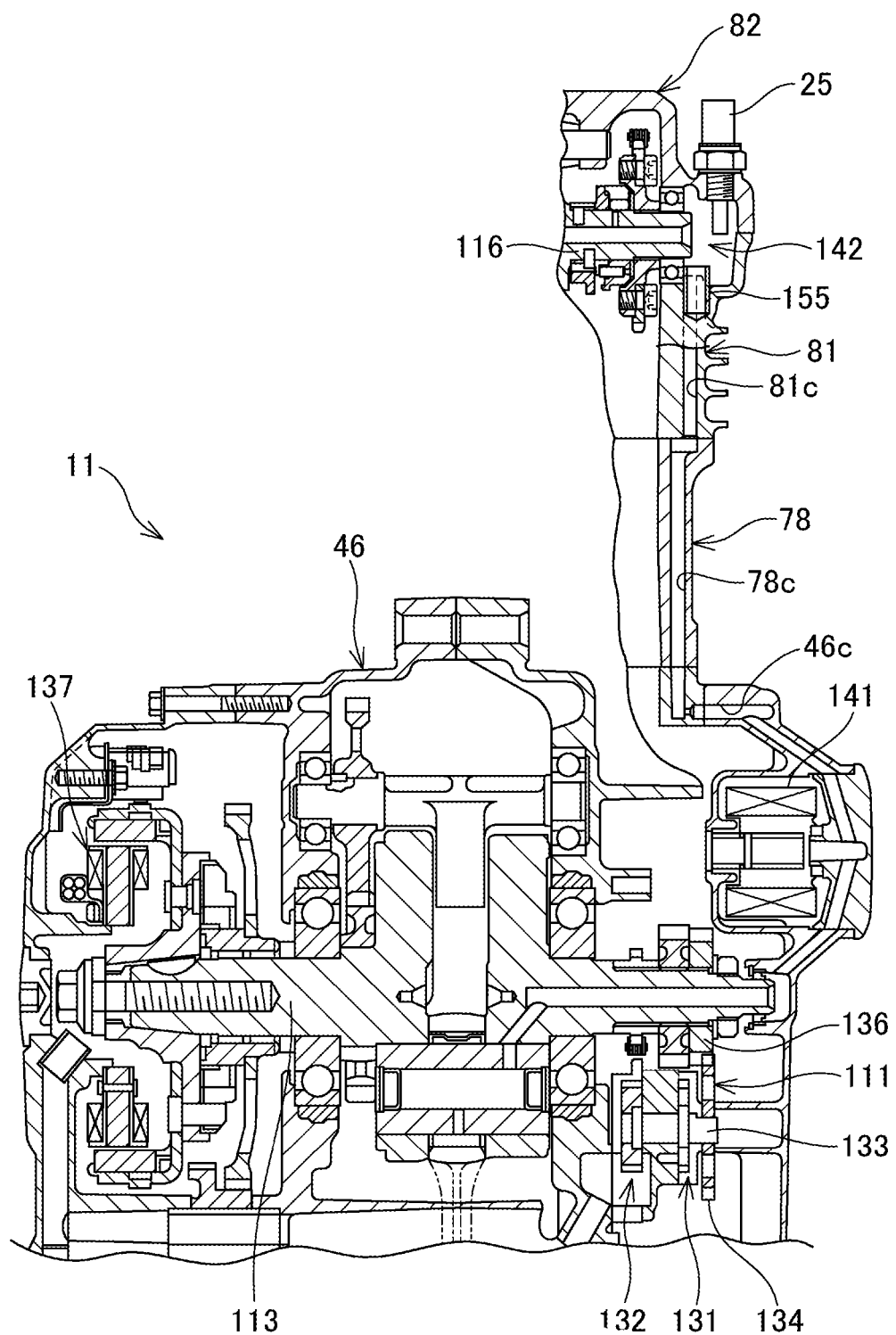
FIG. 7 is a sectional view taken along line VII-VII of FIG. 6.

FIG. 7 is a sectional view taken along line VII-VII of FIG. 6.

The oil pump 111 of the internal combustion engine 11 is composed of: a feed pump 131 that feeds oil into individual portions of the internal combustion engine 11 from the oil tank 87 (see FIG. 2); and a scavenging pump 132 that returns oil stored in an oil sump (not shown) provided at a lower end of the internal combustion engine 11 to the oil tank 87. The feed pump 131 and the scavenging pump 132 have a common rotating shaft 133. The rotating shaft 133 is mounted with a pump-side gear 134. With the pump-side gear 134 meshing with a pump drive gear 136 mounted to one end of the crankshaft 113, the crankshaft 113 rotates, thereby driving the feed pump 131 and the scavenging pump 132 through the pump drive gear 136 and the pump-side gear 134. It is to be noted that reference numeral 137 denotes an AC generator provided on the other end of the crankshaft 113.

The feed pump 131 forces the oil sucked up from the oil tank 87 to pass through an oil filter 141 provided in the crankcase 46, and through oil passages 46c, 78c, and 81c that are formed in the crankcase 46, the cylinder block 78, and the cylinder head 81, respectively, into an oil storage portion 142 that is formed by the cylinder head 81 and the head cover 82. The oil is fed from the oil storage portion 142 to the camshaft 116 and its peripheral valve train.

Figure 8:
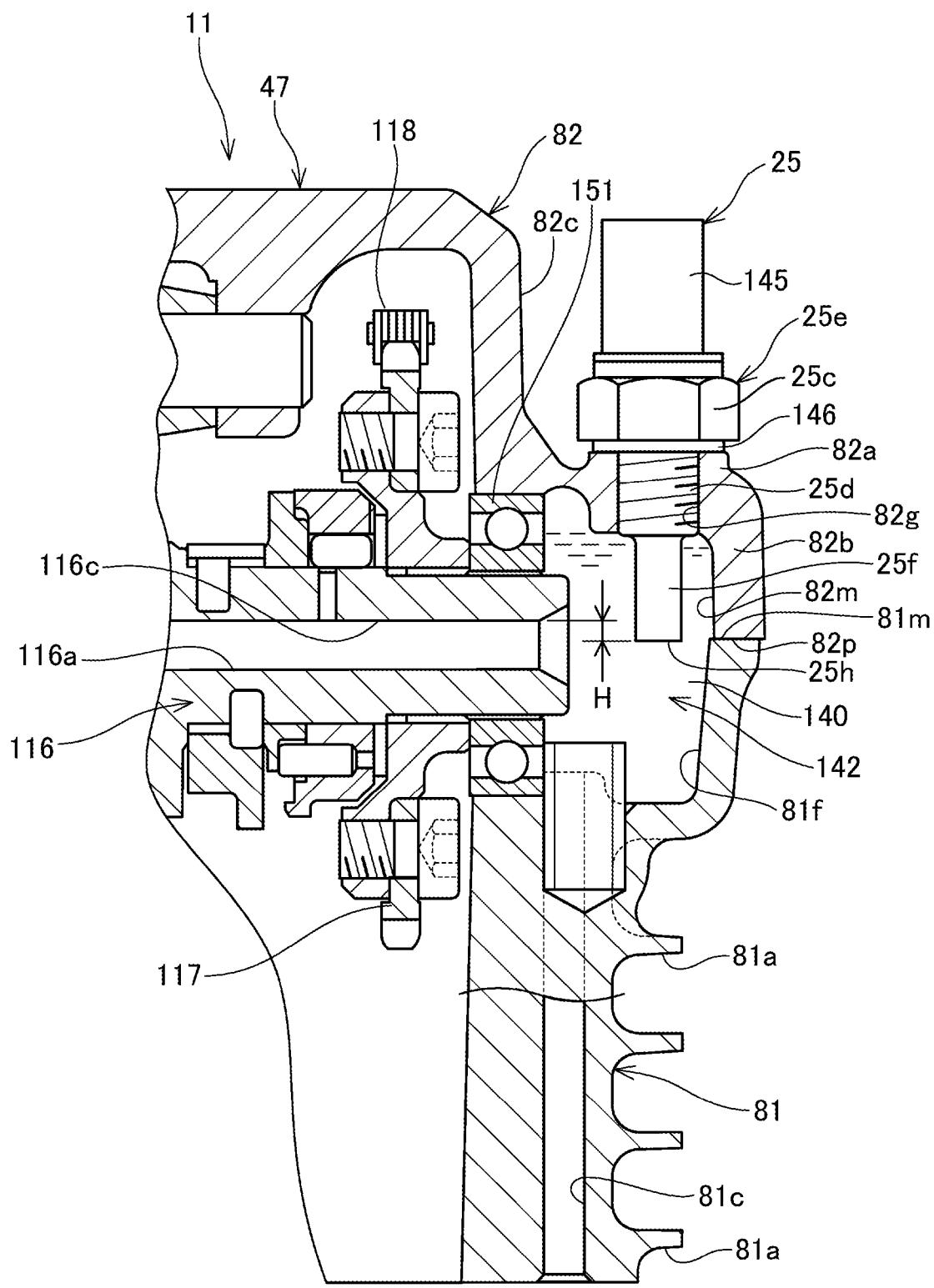
FIG. 8 is a sectional view showing an upper portion of the cylinder portion of the internal combustion engine.

FIG. 8 is a sectional view showing an upper portion of the cylinder portion 47 of the internal combustion engine 11.

The oil storage portion 142 formed in a mating portion between the cylinder head 81 and the head cover 82 is provided below the shoulder 82a of the head cover 82. The temperature of oil 140 stored in the oil storage portion 142 is detected by the oil temperature sensor 25 mounted to the shoulder 82a.

The oil temperature sensor 25, the lower wall 82b of the shoulder 82a of the head cover 82, and the oil storage portion 142 located below the shoulder 82a are provided in a dead space that is formed above the fins 81a of the cylinder head 81 outwardly in the vehicle width direction of the vertical wall 82c of the head cover 82. Thus, it is possible to suppress the amount of protrusion that the oil temperature sensor 25, the lower wall 82b, and a sidewall 81p of the cylinder head 81 which forms the oil storage portion 142, protrude outwardly in the vehicle width direction (to the right in the drawing).

The oil temperature sensor 25 is composed of: a sensor base 25e that is formed with a hexagonal portion 25c for engaging a tool, and an externally threaded portion 25d; a temperature detector 25f that is formed in a manner protruding from the externally threaded portion 25d to detect an oil temperature; and a connector 145 that is provided at an end of the hexagonal portion 25c for connecting the sensor cord 85 (see FIG. 4). The externally threaded portion 25d threadably engages an internal thread 82g formed in the lower wall 82b of the shoulder 82a. The temperature detector 25f is a portion inserted into the oil storage portion 142. It is to be noted that reference numeral 146 denotes a seal member that is provided between the lower wall 82b and the hexagonal portion 25c for preventing oil leak.

Both ends of the camshaft 116 are rotatably supported by a pair of bearings 151 (the reference numeral 151 on one side is not shown) held by the cylinder head 81 and the head cover 82. The camshaft 116 is provided with a cam oil passage 116a that extends axially. The oil storage portion 142 is filled with the oil 140 to be supplied in volume toward the camshaft 116. The oil 140 in the oil storage portion 142 is supplied to the camshaft 116 and valve gears located at the periphery of the camshaft 116 through the cam oil passage 116a.

A leading end surface 25h of the temperature detector 25f of the oil temperature sensor 25 is on the same level as the mating face 82p of the head cover 82 with the cylinder head 81. Also, the leading end surface 25h is located by height H below a passage uppermost portion 116c of the cam oil passage 116a which is in its highest position.

Thus, for example, even when air bubbles formed by the mixing of gas, such as air, into the oil 140 in the oil storage portion 142 move from the oil storage portion 142 to the cam oil passage 116a of the camshaft 116, at least a portion of the temperature detector 25f, on the side thereof on which the leading end surface 25h is disposed, is constantly immersed in the oil 140, so that the temperature of the oil 140 can be always accurately detected. Consequently, for example when the internal combustion engine 11 started in a cold state is in warming-up operation, it is possible to quickly detect with the oil temperature sensor 25 that the warming-up has been completed, that is, the oil temperature has reached a predetermined oil temperature, thereby allowing a reduction in the amount of warming-up time.

Particularly in general air-cooled internal combustion engines, as compared with water-cooled internal combustion engines, temperatures of an internal combustion engine in operation vary greatly among individual portions of the internal combustion engine. Also, changes in temperature after a stop of the internal combustion engine are likely to vary among individual portions of the internal combustion engine. Therefore, it is difficult to identify the temperature of the internal combustion engine, and it is also difficult to select the mounting location of an oil temperature sensor that detects the oil temperature giving an indication of the temperature of the internal combustion engine.

In this embodiment, the oil temperature sensor 25 is provided in the oil storage portion 142 with a large capacity provided in the middle of the oil passage. The oil temperature sensor 25 detects the temperature of the oil 140 in the oil storage portion 142 that is filled with the oil 140 to be supplied in volume toward the camshaft 116, and further, detects the temperature of oil in the oil storage portion 142 formed between the cylinder head 81 and the head cover 82 located close to the combustion chamber of the internal combustion engine 11. Therefore, the temperature of the oil 140 in the oil storage portion 142 can be identified as the typical temperature of the internal combustion engine 11 and can provide, for example, an indication of the warming-up state of the internal combustion engine 11.

Figure 9A:
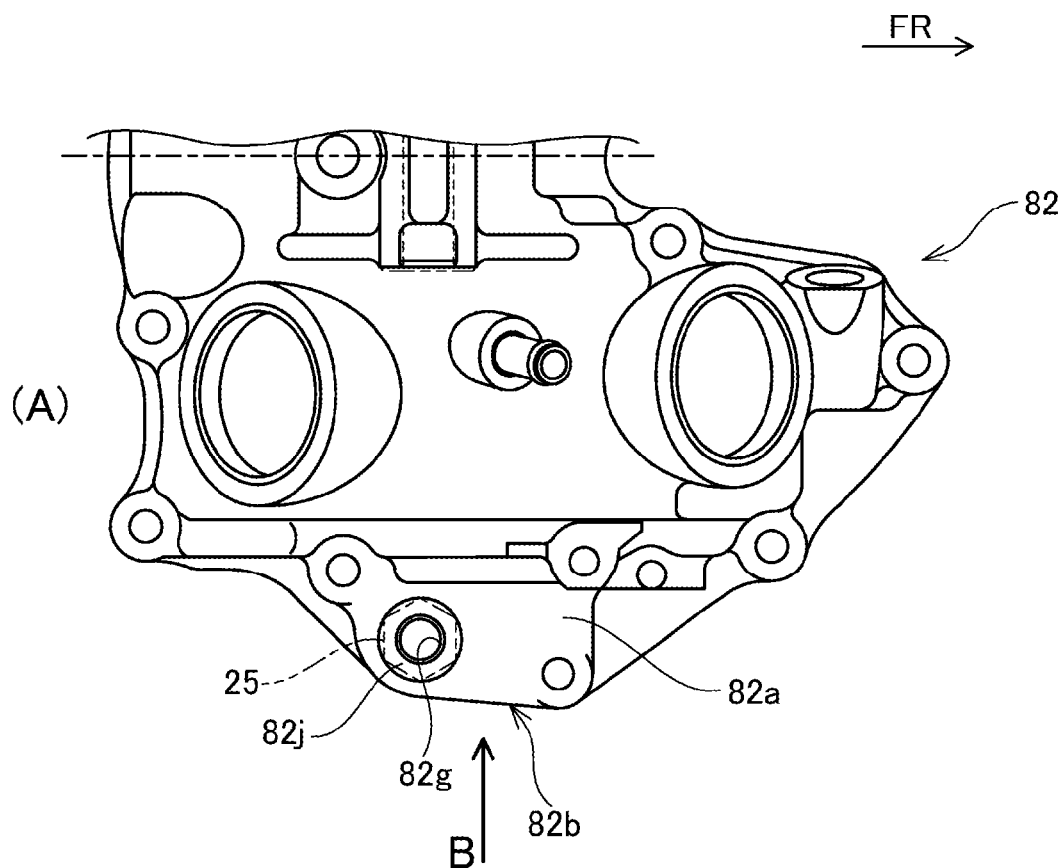
FIG. 9($a$)-9($b$) is an illustration showing a head cover.
Figure 9B:
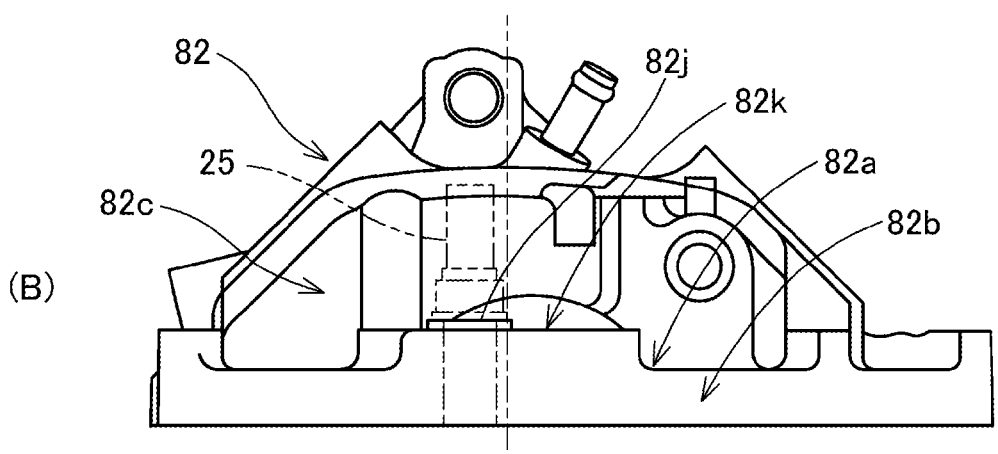

FIG. 9 is an illustration of the head cover 82, wherein FIG. 9(A) is a plan view of parts of the head cover and FIG. 9(B) is a view in the direction of the arrow B in FIG. 9(A).

As shown in FIG. 9(A), the lower wall 82b of the shoulder 82a of the head cover 82 is formed in a substantially trapezoid shape in plan view. A seat portion 82j for mounting the oil temperature sensor 25 is formed in the vicinity of one end of an upper base of the trapezoid. The internal thread 82g is formed in the seat portion 82j in a manner penetrating therethrough.

As shown in FIG. 9(B), the lower wall 82b has an uneven upper surface and a lower surface with a flat wall in side view. The seat portion 82j is formed on a central protrusion 82k that is formed in the center in the front-rear direction. The vertical wall 82c is raised in the center, and gradually lowered with increasing distance forwardly or rearwardly from the center.

Figure 10:
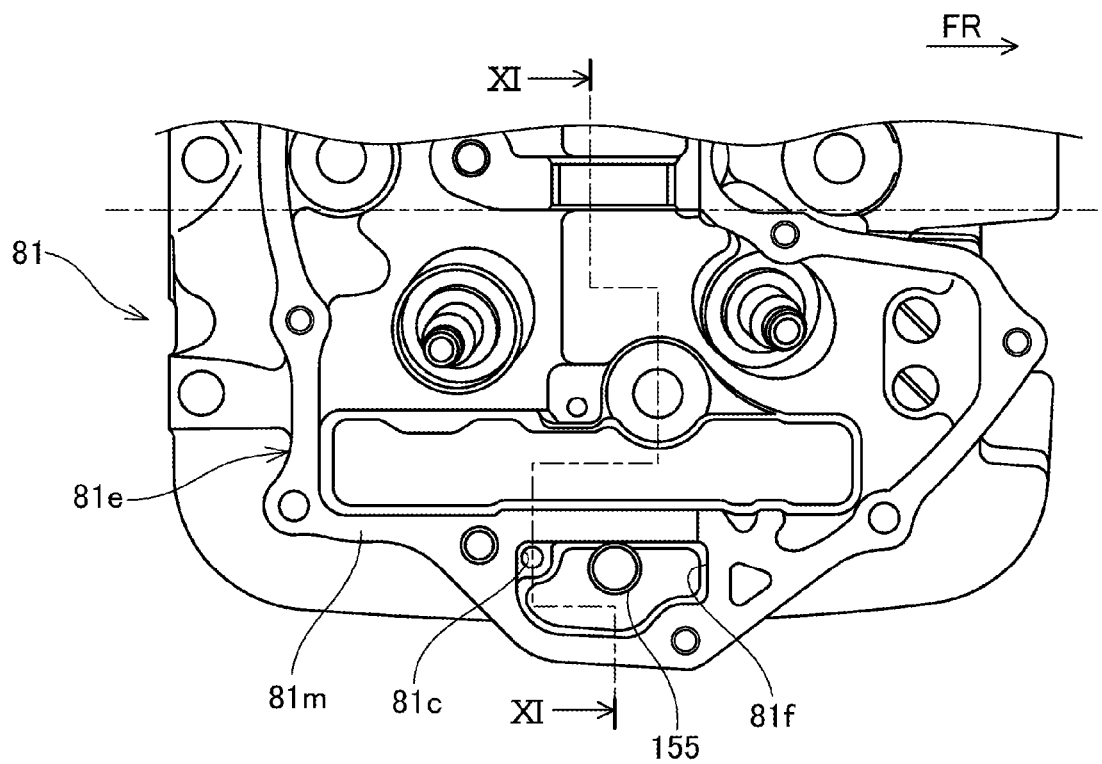
FIG. 10 is an illustration showing the essential parts of a cylinder head.

FIG. 10 is a plan view showing the essential parts of the cylinder head 81.

An oil storage recess 81f for forming the oil storage portion 142 (see FIG. 8) is formed in an upper surface 81e of the cylinder head 81, more specifically, a mating face 81m of the cylinder head 81 with the head cover 82 (see FIG. 9(A)). The oil passage 81c opens into a corner of the oil storage recess 81f. The oil storage recess 81f has an outline elongated in the vehicle-body front-rear direction, and thus it is possible to prevent the oil storage portion 142 from protruding greatly laterally (downwardly in the drawing) while ensuring the capacity of the oil storage portion 142 and suppress an increase in width of the cylinder portion 47 (see FIG. 6) of the internal combustion engine 11 (see FIG. 6). It is to be noted that reference numeral 155 denotes a knock-pin that is mounted to the cylinder head 81 for positioning the cylinder head 81 and the head cover 82.

Referring back to FIG. 8, an oil storage recess 82m having the same outline as the oil storage recess 81f in plan view is also formed in a lower surface of the head cover 82, more specifically, the mating face 82p, for forming the oil storage portion 142 in cooperation with the above-described oil storage recess 81f.

Figure 11:
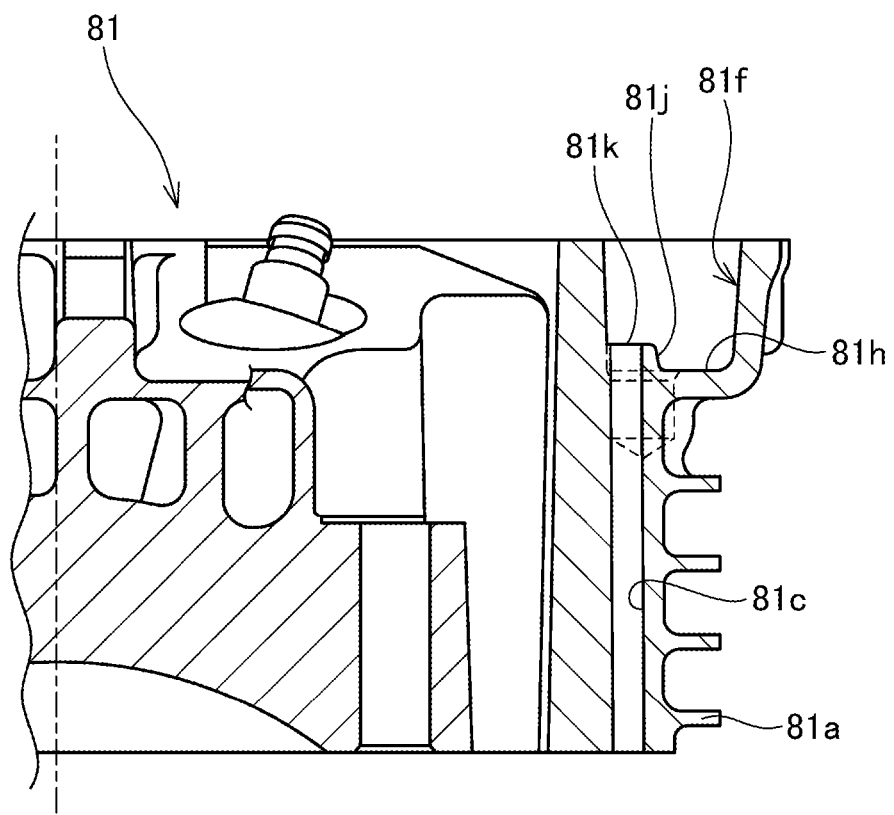
FIG. 11 is a sectional view taken along line XI-XI of FIG. 10.

FIG. 11 is a sectional view taken along line XI-XI of FIG. 10.

The oil storage recess 81f of the cylinder head 81 has a bottom surface 81h formed with a raised portion 81j that is raised above the bottom surface 81h. The oil passage 81c opens into an upper surface 81k of the raised portion 81j. In this manner, the oil passage 81c opens into the upper surface 81k of the raised portion 81j, and therefore, for example when a foreign substance in oil enters the oil storage portion 142 (see FIG. 8) through the oil passage 81c, the foreign substance is allowed to drop onto the bottom surface 81*h* of the oil storage recess 81*f* under its own weight and accumulate therein. Thus, it is possible to prevent the foreign substance from moving to the side on which the camshaft 116 (see FIG. 8) is disposed, corresponding to the downstream direction in which the oil in the oil storage portion 142 flows.

If the structure is such that the raised portion 81*j* is not formed and the oil passage 81*c* opens into the bottom surface 81*h* of the oil storage recess 81*f*, the foreign substance is likely to move with the flow of the oil in the oil storage portion 142 and reach individual portions of the valve train through the cam oil passage 116*a* of the camshaft 116.

As shown in FIGS. 2 to 5 described above, in the oil temperature sensor mounting structure for the internal combustion engine 11 in which the oil temperature sensor 25 for detecting the temperature of oil is mounted to the cylinder portion 47 protruding upwardly from the crankcase 46, the upper portion of the cylinder portion 47 is laterally covered with the body cover 44. The head cover 82 is provided on the cylinder head 81 constituting the upper portion of the cylinder portion 47. The upper portion of the head cover 82 is formed with the shoulder 82*a* serving as a shoulder that is located below its periphery and protrudes laterally. The oil temperature sensor 25 is mounted to the shoulder 82*a* inwardly in the vehicle width direction of the body cover 44. Thus, the oil temperature sensor 25 can be protected by laterally covering it with the body cover 44, thereby eliminating the need for a special protective member. Therefore, cost can be reduced. Furthermore, the oil temperature sensor 25 is mounted to the shoulder 82*a* formed at the upper portion of the head cover 82. Thus, the oil temperature sensor 25, which is disposed at the upper portion of the shoulder 82*a*, can be also protected from below by the shoulder 82*a*, more specifically, the lower wall 82*b* of the shoulder 82*a*. In this manner, the oil temperature sensor 25 can be protected with simple structures such as the shoulder 82*a* and the above-described existing body cover 44.

Moreover, the oil temperature sensor 25 is covered with the body cover 44 and prevented from being exposed to the outside, thereby allowing an improvement in appearance. Further, since the oil temperature sensor 25 can be mounted to the shoulder 82*a* from above and is prevented from protruding greatly laterally, the body cover 44 can be disposed close to the internal combustion engine 11, thereby allowing miniaturization and downsizing of the vehicle body.

Additionally, as shown in FIGS. 6 to 8, the camshaft 116 provided in the cylinder head 81 is provided, at one end thereof, with the driven sprocket 117 to which torque to the camshaft 116 is transmitted from the crankshaft 113. Also, the oil temperature sensor 25 is disposed lateral to the driven sprocket 117, in the vicinity of the periphery of one of the bearings 151 serving as a bearing portion that supports the camshaft 116. Thus, the dead space formed lateral to the driven sprocket 117 in the vicinity of the periphery of the bearing 151 can be effectively used, and the oil temperature sensor 25 can be prevented from protruding laterally.

Furthermore, as shown in FIG. 8, the temperature detector 25*f* of the oil temperature sensor 25 is provided in the vertically-expanded oil storage portion 142 facing an end of the cam oil passage 116*a* formed in the camshaft 116. Thus, the oil storage portion 142 can be constantly filled with a volume of the oil 140 to be supplied to the camshaft 116, thereby allowing accurate detection of the temperature of the oil 140 in the oil storage portion 142 and accurate control of the fast idle state or the like of the internal combustion engine 11.

Also, the temperature detector 25*f* of the oil temperature sensor 25 is located below an upper end (the passage uppermost portion 116*c*) of the cam oil passage 116*a* of the camshaft 116. Thus, even if air bubbles accumulate in the cam oil passage 116*a* or an upper portion of the oil storage portion 142, the temperature detector 25*f* of the oil temperature sensor 25 can detect the temperature of oil without being affected by the air bubbles, thereby allowing a further increase in the precision of detection of the temperature of the oil 140.

Moreover, as shown in FIG. 3, the body cover 44 includes the front shroud 57 and the side cover 58 serving as two covers separated in the vehicle-body front-rear direction, and the oil temperature sensor 25 is provided in the vicinity of a separated position of the front shroud 57 and the side cover 58. Thus, by removing one of the covers (for example, the side cover 58), maintenance for the oil temperature sensor 25 can be easily performed. In addition, since the oil temperature sensor 25 is provided in the vicinity of the separated position of the front shroud 57 and the side cover 58, the maintenance can be performed from any side of the front shroud 57 and the side cover 58, so that maintainability can be increased.

Additionally, as shown in FIGS. 2, 4, and 5, the sensor cord 85 connected to the oil temperature sensor 25 extends upwardly from the oil temperature sensor 25 and is connected to the main harness 86 disposed along the body frame 13, more specifically, the main frame 91. Also, the oil temperature sensor 25 and the sensor cord 85 are covered from the vehicle-body front by the oil tank 87 serving as an auxiliary machine. Thus, there is no need to make allowance in the length of the sensor cord 85 from an upper end of the oil temperature sensor 25 to the main harness 86, for example, for objects interfering with the sensor cord 85 from the vehicle-body front, and therefore the sensor cord 85 can be reduced in length.

Also, the auxiliary machine is the oil tank 87 for storing oil. Thus, even after the stop of the internal combustion engine 11, the internal combustion engine 11 is kept warm by the radiation heat from the oil tank 87. Therefore, atomization of the fuel supplied to the combustion chamber of the internal combustion engine 11 is promoted, thereby allowing an improvement in starting performance of the internal combustion engine 11. Furthermore, the internal combustion engine 11, especially in the mounting position of the oil temperature sensor 25 and its vicinity, is kept warm. Thus, in restarting the internal combustion engine 11, a reduction in the temperature of the oil circulating through the internal combustion engine 11 can be prevented. Also, it is possible to accurately gain an understanding of the warming-up state of the internal combustion engine 11 on the basis of the oil temperature detected by the oil temperature sensor 25. Consequently, it is possible to quickly detect, with the oil temperature sensor 25, when the warming-up of the internal combustion engine 11 has been completed, thereby allowing a reduction in the amount of time for warming-up operation.

It should be understood that the above-described embodiment is given to illustrate an aspect of the present invention, and various modifications and applications may be arbitrarily made without departing from the spirit of the invention.

The case where the invention is applied to the motorcycle 10 has been described, however, the invention is not limited thereto, but also is applicable to various saddle-ride type vehicles in addition to the motorcycles. It should be noted that examples of the saddle-ride type vehicle include general vehicles in which a rider sits astride a vehicle body, and include not only motorcycles (including motor-assisted bicycles), but also three-wheeled or four-wheeled vehicles classified as ATVs (All Terrain Vehicles).

I claim:

1. An oil temperature sensor mounting structure for an internal combustion engine of a vehicle, comprising:

a crankcase, a cylinder portion protruding upwardly from said crankcase, said cylinder portion comprising an upper portion, a body cover covering said upper portion of said cylinder portion, a head cover provided on a cylinder head constituting said upper portion of said cylinder portion, said head cover comprising an upper portion including a shoulder, and an oil temperature sensor for detecting temperature of oil, said oil temperature sensor being mounted to said cylinder portion, wherein said shoulder of said head cover is located below a periphery of the head cover and protruding laterally; and wherein said oil temperature sensor is mounted to the shoulder inward in a vehicle width direction of said body cover.

2. The oil temperature sensor mounting structure for the internal combustion engine of the vehicle, according to claim 1, wherein said cylinder head is provided with a camshaft, said camshaft being provided at one end thereof with a driven sprocket to which torque to said camshaft is transmitted from said crankshaft; and wherein said oil temperature sensor is disposed lateral to said driven sprocket, in the vicinity of a periphery of a bearing portion that supports said camshaft.

3. The oil temperature sensor mounting structure for the internal combustion engine of the vehicle according to claim 2, wherein said oil temperature sensor includes a temperature detector, said temperature detector being provided in a vertically-expanded oil storage portion facing an end of an oil passage formed in the camshaft.

4. The oil temperature sensor mounting structure for the internal combustion engine of the vehicle according to claim 3, wherein said temperature detector of the oil temperature sensor is located below an upper end of said oil passage of said camshaft.

5. The oil temperature sensor mounting structure for the internal combustion engine of the vehicle according to claim 1, wherein said body cover includes a front shroud and a side cover separated in a vehicle-body front-rear direction, and wherein said oil temperature sensor is provided in the vicinity of a separated position of said front shroud and said side cover.

6. The oil temperature sensor mounting structure for the internal combustion engine of the vehicle according to claim 2, wherein said body cover includes a front shroud and a side cover separated in a vehicle-body front-rear direction, and wherein said oil temperature sensor is provided in the vicinity of a separated position of said front shroud and said side cover.

7. The oil temperature sensor mounting structure for the internal combustion engine of the vehicle according to claim 3, wherein said body cover includes a front shroud and a side cover separated in a vehicle-body front-rear direction, and wherein said oil temperature sensor is provided in the vicinity of a separated position of said front shroud and said side cover.

8. The oil temperature sensor mounting structure for the internal combustion engine of the vehicle according to claim 4, wherein said body cover includes a front shroud and a side cover separated in a vehicle-body front-rear direction, and wherein said oil temperature sensor is provided in the vicinity of a separated position of said front shroud and said side cover.

9. The oil temperature sensor mounting structure for the internal combustion engine of the vehicle according to claim 1, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

10. The oil temperature sensor mounting structure for the internal combustion engine of the vehicle according to claim 2, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

11. The oil temperature sensor mounting structure for the internal combustion engine of the vehicle according to claim 3, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

12. The oil temperature sensor mounting structure for the internal combustion engine of the vehicle according to claim 4, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

13. The oil temperature sensor mounting structure for the internal combustion engine of the vehicle according to claim 5, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

14. The oil temperature sensor mounting structure for the internal combustion engine of the vehicle according to claim 6, wherein a sensor cord connected to said oil temperature sensor extends upwardly from said oil temperature sensor and is connected to a main harness along a body frame of the vehicle, and wherein said oil temperature sensor and said sensor cord are covered with an auxiliary machine from a vehicle-body front.

15. The oil temperature sensor mounting structure for the internal combustion engine of the vehicle according to claim 7,
wherein a sensor cord connected to said oil temperature sensor extends upwardly from said oil temperature sensor and is connected to a main harness along a body frame of the vehicle, and
wherein said oil temperature sensor and said sensor cord are covered with an auxiliary machine from a vehicle-body front.

16. The oil temperature sensor mounting structure for the internal combustion engine of the vehicle according to claim 8,
wherein a sensor cord connected to said oil temperature sensor extends upwardly from said oil temperature sensor and is connected to a main harness along a body frame of the vehicle, and
wherein said oil temperature sensor and said sensor cord are covered with an auxiliary machine from a vehicle-body front.

17. The oil temperature sensor mounting structure for the internal combustion engine of the vehicle according to claim 9, wherein said auxiliary machine is an oil tank that stores the oil.

18. The oil temperature sensor mounting structure for the internal combustion engine of the vehicle according to claim 10, wherein said auxiliary machine is an oil tank that stores the oil.

19. The oil temperature sensor mounting structure for the internal combustion engine of the vehicle according to claim 11, wherein said auxiliary machine is an oil tank that stores the oil.

20. The oil temperature sensor mounting structure for the internal combustion engine of the vehicle according to claim 12, wherein said auxiliary machine is an oil tank that stores the oil.

* * * * *